United States Patent
Chandler et al.

(10) Patent No.: US 10,094,281 B2
(45) Date of Patent: Oct. 9, 2018

(54) GAS TURBINE ENGINE WITH TWIN OFFSET GAS GENERATORS

(71) Applicant: United Technologies Corporation, Hartford, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 588 days.

(21) Appl. No.: 14/595,284

(22) Filed: Jan. 13, 2015

(65) Prior Publication Data

US 2015/0211416 A1 Jul. 30, 2015

Related U.S. Application Data

(60) Provisional application No. 61/933,353, filed on Jan. 30, 2014.

(51) Int. Cl.

| | |
|---|---|
| *F02C 6/00* | (2006.01) |
| *F02C 6/02* | (2006.01) |
| *F02K 3/068* | (2006.01) |
| *F02C 6/06* | (2006.01) |

(52) U.S. Cl.
CPC ............ *F02C 6/02* (2013.01); *F02C 6/06* (2013.01); *F02K 3/068* (2013.01); *F05D 2250/314* (2013.01)

(58) Field of Classification Search
CPC .. F02C 6/02; F02C 3/107; F02C 3/113; F02C 3/10; F02C 7/36; F02K 3/00; F02K 3/06; F02K 3/068
See application file for complete search history.

(56) References Cited

U.S. PATENT DOCUMENTS

| | | | |
|---|---|---|---|
| 6,571,563 B2 | 6/2003 | Yim et al. | |
| 6,735,954 B2 | 5/2004 | MacFarlane et al. | |
| 2008/0155961 A1* | 7/2008 | Johnson | F02K 3/075 60/226.3 |
| 2009/0104019 A1 | 4/2009 | MacFarlane | |
| 2012/0272656 A1* | 11/2012 | Norris | F02C 3/145 60/772 |
| 2012/0291415 A1* | 11/2012 | Marshall | F02K 1/09 60/226.2 |

* cited by examiner

*Primary Examiner* — Craig Kim
*Assistant Examiner* — Katheryn Malatek
(74) *Attorney, Agent, or Firm* — Carlson, Gaskey & Olds, P.C.

(57) ABSTRACT

A gas turbine engine comprises a fan on an engine central axis. Plural gas generators are downstream of the fan, each along a respective central axis, mutually offset, and offset from the engine central axis. A fan drive turbine is on the engine central axis, downstream of the dual gas generators, and driven by output from the dual gas generators, to drive the fan.

11 Claims, 4 Drawing Sheets

GAS TURBINE ENGINE WITH TWIN OFFSET GAS GENERATORS

CROSS-REFERENCE TO RELATED APPLICATION

This application claims priority to U.S. Provisional Patent Application No. 61/933,353, filed Jan. 30, 2014.

BACKGROUND OF THE INVENTION

This application relates to a gas turbine engine having a plurality of offset engine cores.

Gas turbine engines are known and, typically, include a fan delivering air into a bypass duct as propulsion air. The air is also delivered into a core engine where it passes to a compressor. Compressed air is passed into a combustor where it is mixed with fuel and ignited. Products of this combustion pass downstream across turbine rotors driving them to rotate.

Historically, the fan, compressor rotors and turbine rotors all rotated about a common axis.

Recently, it has been proposed to offset the core engine such that it extends along an axis which is non-parallel to the axis about which the fan rotates. This has advantages in that it may allow the overall length of the engine to be reduced.

SUMMARY OF THE INVENTION

In a featured embodiment, a gas turbine engine comprises a fan on an engine central axis. Plural gas generators are downstream of the fan, each along a respective central axis, mutually offset, and offset from the engine central axis. A fan drive turbine is on the engine central axis, downstream of the dual gas generators, and driven by output from the dual gas generators, to drive the fan.

In another embodiment according to the previous embodiment, the gas generators each include at least one compressor, a turbine and an intermediate combustor.

In another embodiment according to any of the previous embodiments, the fan drive turbine is driven by products of combustion which have passed downstream over the gas generator turbines.

In another embodiment according to any of the previous embodiments, the gas generators each include a generator exhaust duct extending toward the engine central axis from the gas generator turbine to deliver the products of combustion into an exhaust housing and across the fan drive turbine.

In another embodiment according to any of the previous embodiments, the generator exhaust ducts extend at an angle which extends toward the engine central axis at a more dramatic angle than a direction of the respective central axes of gas generators.

In another embodiment according to any of the previous embodiments, a nacelle surrounds the fan rotor and receives bypass air for propulsion.

In another embodiment according to any of the previous embodiments, inlets into the generators are spaced circumferentially in the path of air delivered by the fan into the nacelle.

In another embodiment according to any of the previous embodiments, a bypass ratio is defined as a volume of air not passing into the inlets, compared to a volume of air passing into the inlets, with the bypass ratio being greater than or equal to about 5.0.

In another embodiment according to any of the previous embodiments, struts connect the nacelle to the exhaust housing.

In another embodiment according to any of the previous embodiments, the plurality of gas generators is two.

In another embodiment according to any of the previous embodiments, struts connect the nacelle to the exhaust housing.

In another embodiment according to any of the previous embodiments, the gas generators each include a generator exhaust duct extending toward the engine central axis from the gas generator turbine to deliver the products of combustion into an exhaust housing and across the fan drive turbine.

In another embodiment according to any of the previous embodiments, the generator exhaust ducts extend at an angle which extends toward the engine central axis at a more dramatic angle than a direction of the respective central axes of gas generators.

In another embodiment according to any of the previous embodiments, a nacelle surrounds the fan rotor and receives bypass air for propulsion.

In another embodiment according to any of the previous embodiments, inlets into the gas generators are spaced circumferentially in the path of air delivered by the fan into the nacelle.

In another embodiment according to any of the previous embodiments, a bypass ratio is defined as a volume of air not passing into the inlets, compared to a volume of air passing into the inlets, with the bypass ratio being greater than or equal to about 5.0.

In another embodiment according to any of the previous embodiments, a nacelle surrounds the fan rotor and receives bypass air for propulsion.

In another embodiment according to any of the previous embodiments, inlets into the core engines are spaced circumferentially in the path of air delivered by the fan into the nacelle.

In another embodiment according to any of the previous embodiments, a bypass ratio is defined as a volume of air not passing into the inlet, compared to a volume of air passing into the inlets, with the bypass ratio being greater than or equal to about 5.0.

In another embodiment according to any of the previous embodiments, a gear reduction is positioned between the fan drive turbine and the fan.

These and other features may be best understood from the following drawings and specification.

DETAILED DESCRIPTION

Figure 1:
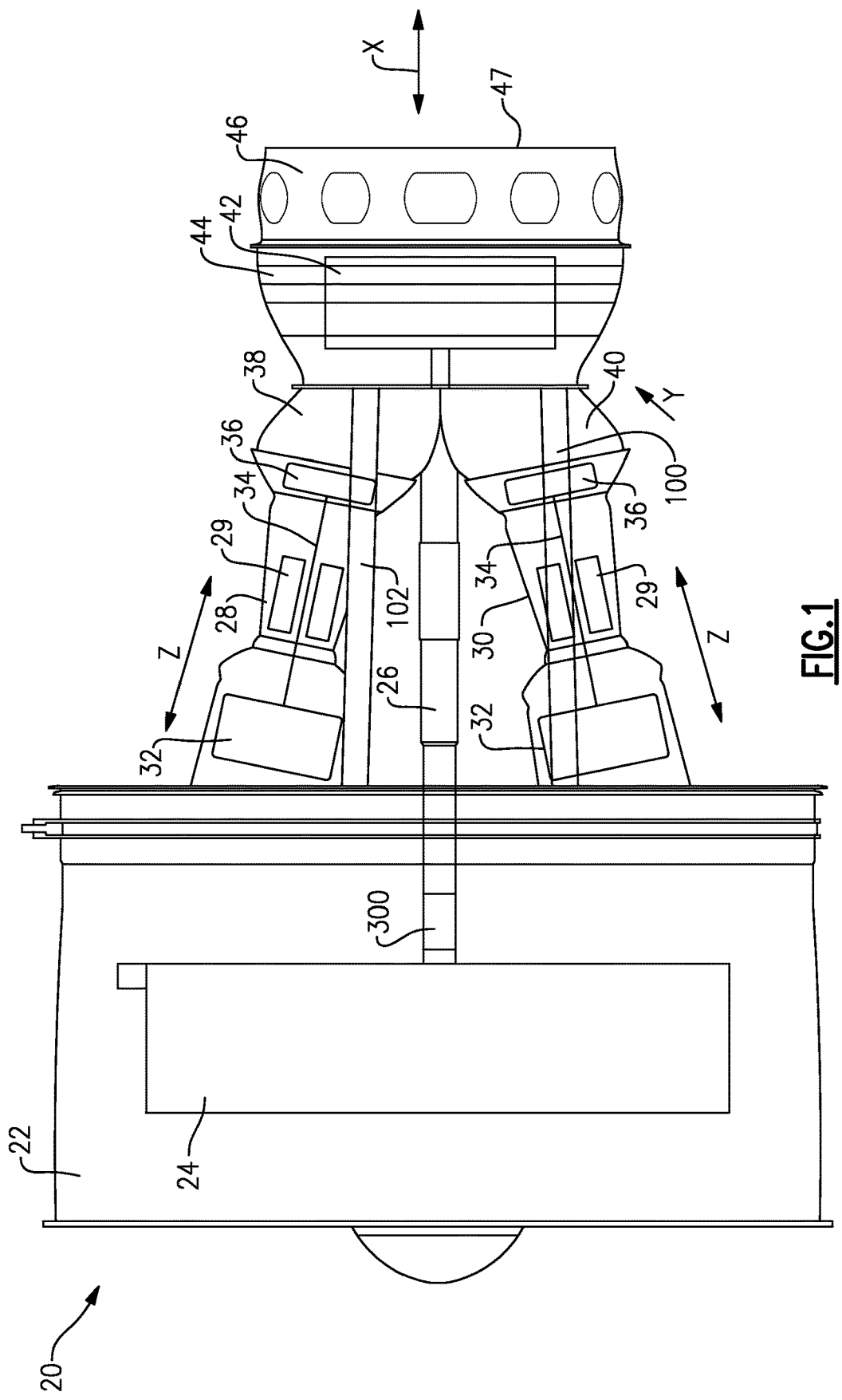
FIG. 1 is a schematic view of a gas turbine engine.

FIG. 1 shows a gas turbine engine 20 having a nacelle 22 receiving a fan rotor 24 driven by a fan drive shaft 26. A pair of core engines, or gas generators 28 and 30, are positioned to receive air from the fan 24. The fan delivers air into the nacelle 22 as bypass air, but a portion of the air from circumferentially separate locations passes into the gas generators 30 and 28. Each gas generator includes a compressor section 32 driven by a shaft 34 which is, in turn, driven by a turbine 36. A combustor section 29 is positioned intermediate the compressor 32 and turbine 36. Exhaust ducts 38 and 40 extend downstream of the location of the turbine 36 into an exhaust housing 42. The products of combustion, downstream of the turbine rotor 36, pass across a fan drive turbine 42 which is driven to rotate to, in turn, rotate the fan drive shaft 26 and, thus, the fan rotor 24. A downstream end 47 of the engine is at the end of an exhaust housing 46. The gas generators 30 and 28 are mutually offset, or angularly skewed. Their exhaust powers the downstream fan drive turbine 42 that, in turn, drives an upstream fan drive shaft 26. A gear reduction 300 might be included between fan drive turbine 42 and fan rotor 24 to lower the speed of rotation of fan rotor 24 relative to the speed of fan drive turbine 42.

As can be appreciated from FIG. 1, the shaft 26 and, hence, the turbine 42 and fan rotor 24 rotate along an axis X. The core engines 28 and 30 extend along a direction Z (although in opposed directions) which is non-parallel to the axis X. In fact, the direction Z extends inwardly toward the axis X at a first angle. As can be appreciated, the exhaust ducts 38 and 40 extend along a direction Y which is at a more dramatic angle inwardly toward the axis X.

Figure 2:
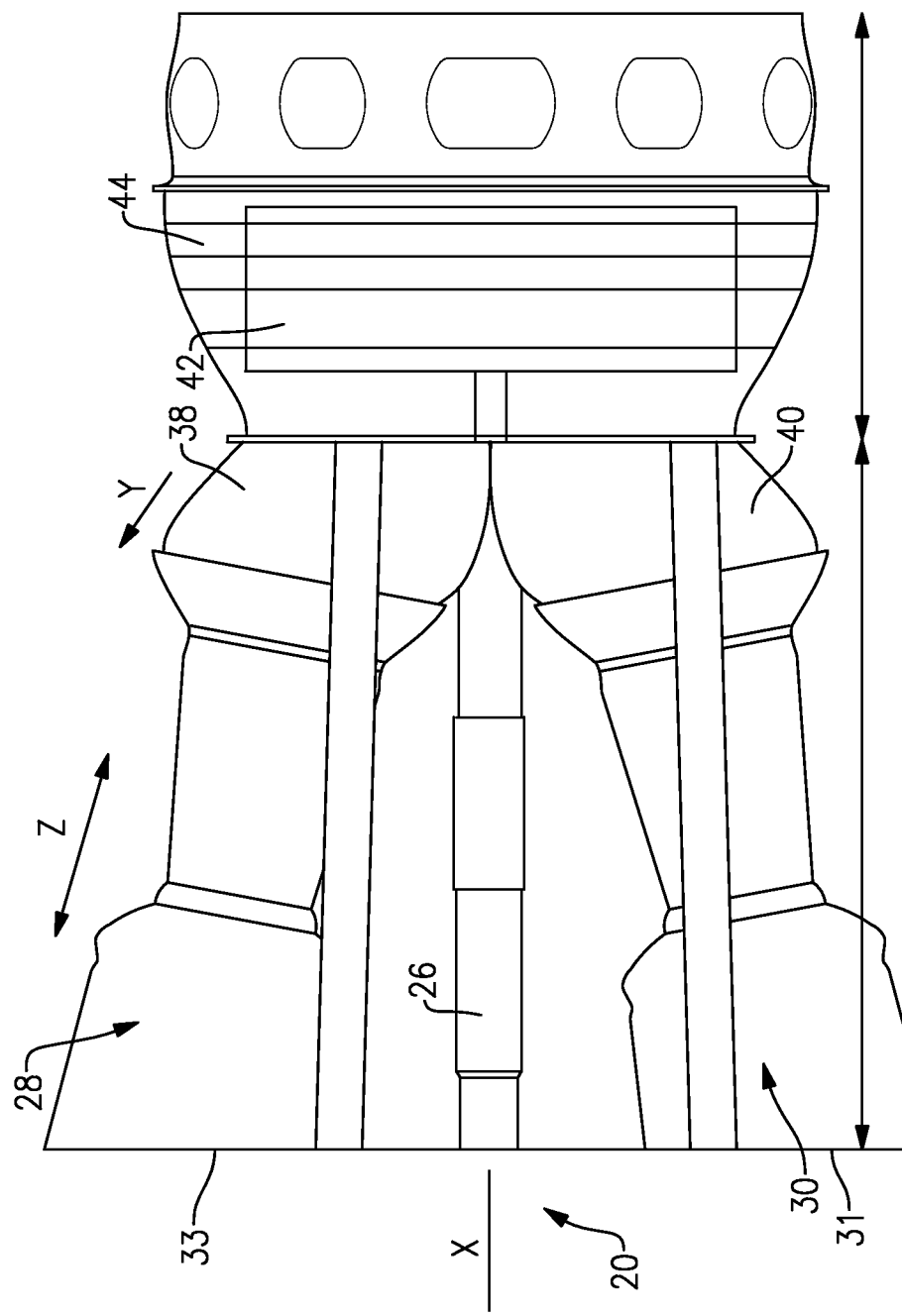
FIG. 2 shows a detail of a portion of the gas turbine engine.

FIG. 2 shows details of the engine 20 including the directions X, Y and Z. As can be appreciated, the free turbine 42 receives air from both ducts 38 and 40. The use of the double cores allows a reduction in the overall length of the engine.

Returning to FIG. 1, struts 100 and 102 connect the fan drive turbine housing 44 to the nacelle 22.

Figure 3:
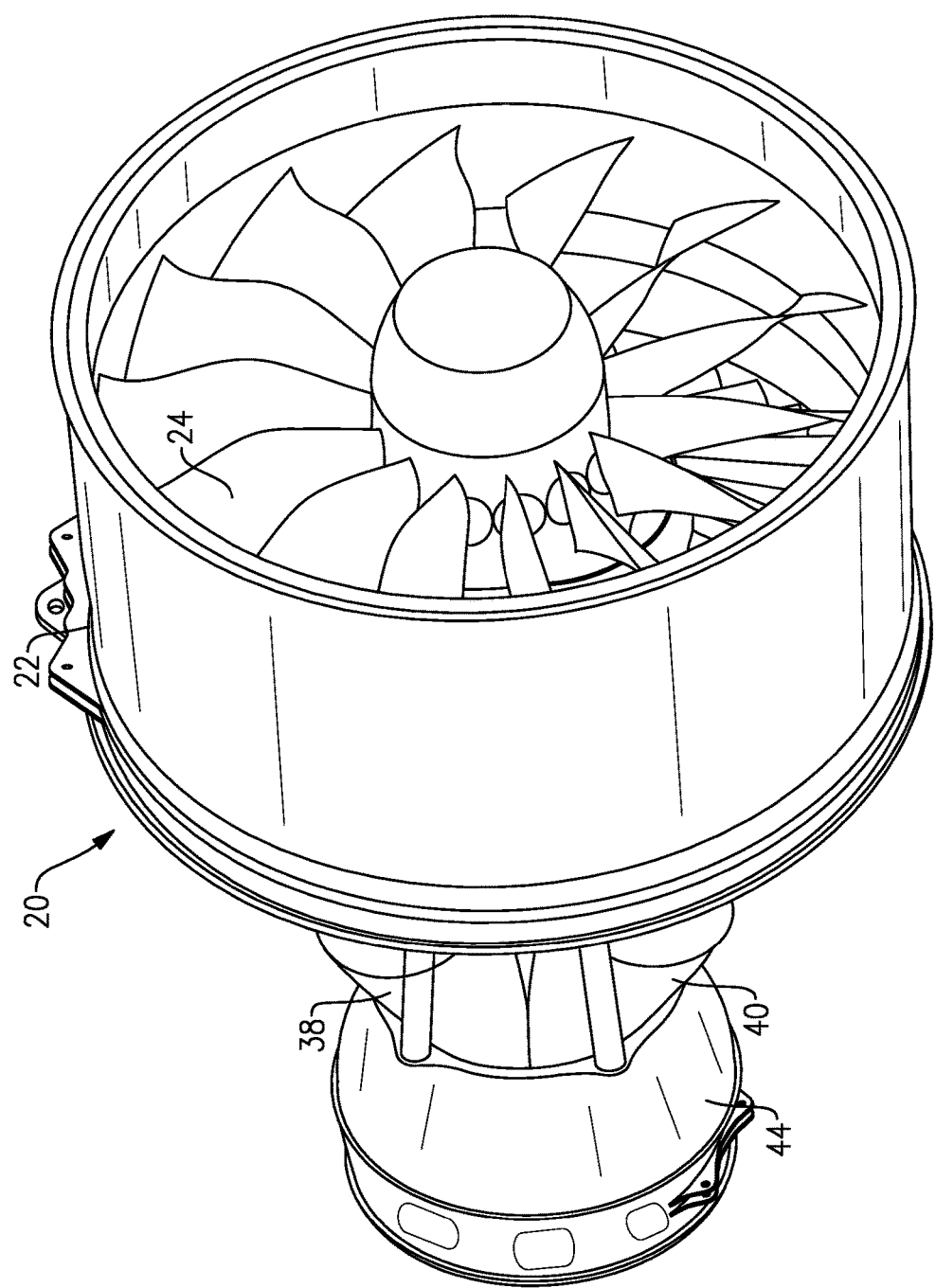
FIG. 3 is a perspective view of the gas turbine engine.

FIG. 3 shows a detail of the engine 20 including the fan rotor 24 at a forward end, the exhaust housing 44 and free turbine housing 44, and the ducts 38 and 40.

As can be seen in FIG. 2, there are inlets 33 and 31 into the core engines 30 and 28, such that the inlets are at circumferentially spaced location in a path of the bypass air within the nacelle 22.

The gas turbine engine 20 has a fan 24 on an engine central axis X. Plural gas generators 28 and 30 are downstream of the fan 24, each along a respective central axis Z that are mutually offset and offset from the engine central axis X. A fan drive turbine 42 is on the engine central axis X, downstream of the dual gas generators 28, 30, and driven by output from the dual gas generators, for driving the fan 24.

The gas generators 28 and 30 include a generator exhaust duct 38, 40 extending toward the engine central axis X from the gas generator turbines 36 to deliver the products of combustion into an exhaust housing 44 and across the fan drive turbine 42. The exhaust ducts 38, 40 extend at an angle Z which extends toward the engine central axis X at a more dramatic angle Y than a direction of the respective central axes Z of the gas generators 28, 30.

Figure 4:
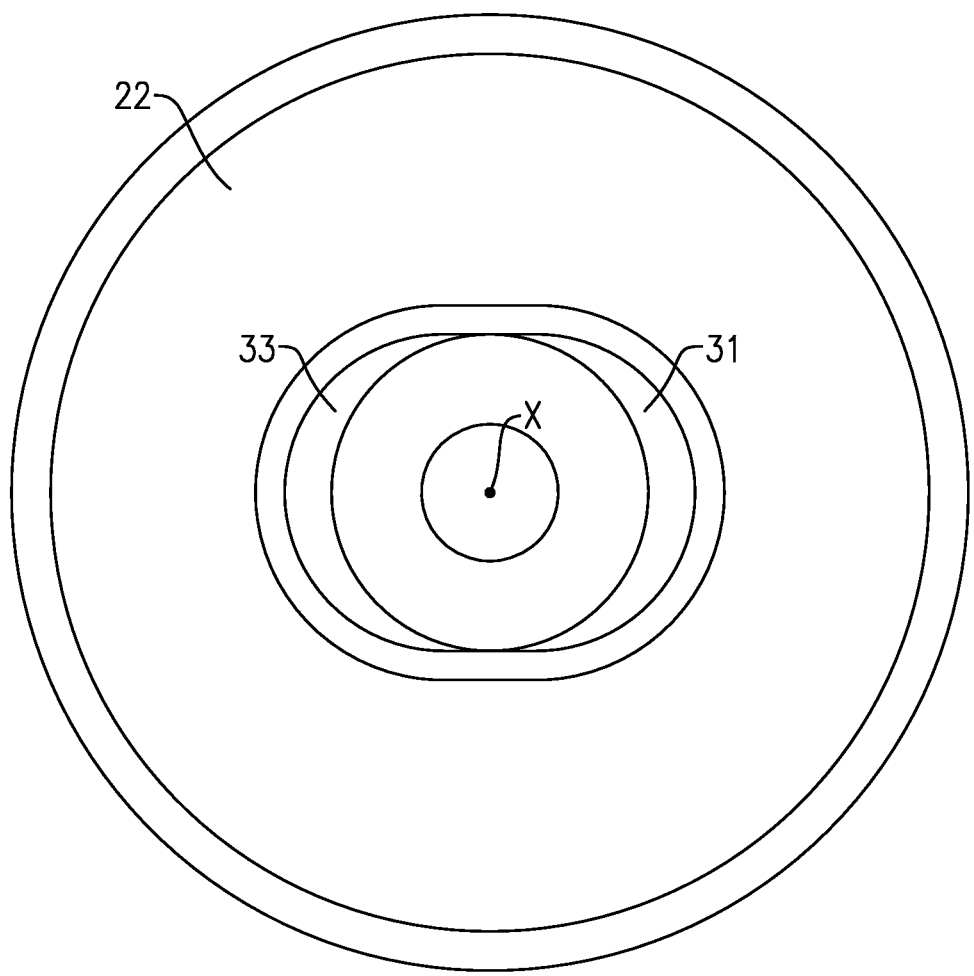
FIG. 4 shows a detail.

The circumferential spacing of inlets 31 and 33 is clear in FIG. 4. The remaining flow path (outside of inlets 32 and 33) provides propulsion. A bypass ratio of the volume of air not passing into inlet 31 or 33 compared to the volume that does pass into an inlet 31 or 33 is greater than or equal to 5.0 and less than or equal to 30.0.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan on an engine central axis;
plural gas generators downstream of the fan, each along a respective central axis that are mutually offset and non-parallel to the engine central axis and extend at a gas generator angle with respect to the engine central axis, wherein a gas generator forward end is closer to the engine central axis than a gas generator aft end; and
a fan drive turbine on the engine central axis, downstream of the plural gas generators, and driven by products of combustion downstream from the plural gas generators, for driving the fan;
wherein said plural gas generators each include a generator exhaust duct to deliver the products of combustion into an exhaust housing and across said fan drive turbine; and
said generator exhaust ducts extend at a generator exhaust duct angle relative to said engine central axis, wherein a generator exhaust duct aft end is closer to the engine central axis than a generator exhaust duct forward end, and
wherein the generator exhaust duct angle is greater than the gas generator angle.

2. The gas turbine engine as set forth in claim 1, wherein said plural gas generators each include at least one compressor, a gas generator turbine and a combustor.

3. The gas turbine engine as set forth in claim 2, wherein said fan drive turbine is driven by said products of combustion which have passed downstream through said gas generator turbines.

4. The gas turbine engine as set forth in claim 3, wherein a nacelle surrounds said fan and receives bypass air for propulsion.

5. The gas turbine engine as set forth in claim 4, wherein inlets into said plural gas generators are spaced circumferentially in a path of the bypass air delivered by said fan into said nacelle.

6. The gas turbine engine as set forth in claim 5, wherein struts connect said nacelle to said exhaust housing.

7. The gas turbine engine as set forth in claim 5, wherein there are two of said plural gas generators.

8. The gas turbine engine as set forth in claim 4, wherein struts connect said nacelle to said exhaust housing.

9. The gas turbine engine as set forth in claim 1, wherein a nacelle surrounds said fan and receives bypass air for propulsion.

10. The gas turbine engine as set forth in claim 9, wherein inlets into said plural gas generators are spaced circumferentially in a path of the bypass air delivered by said fan into said nacelle.

11. The gas turbine engine as set forth in claim 1, wherein a gear reduction mechanism is positioned between the fan drive turbine and the fan.

* * * * *